United States Patent
Maimets

[11] Patent Number: 5,351,720
[45] Date of Patent: Oct. 4, 1994

[54] APPARATUS FOR REPAIRING CONDUITS

[75] Inventor: Lembit Maimets, Richmond Hill, Canada

[73] Assignee: Link-Pipe, Inc., Richmond Hill, Canada

[21] Appl. No.: 849,217

[22] Filed: Mar. 10, 1992

[51] Int. Cl.⁵ .............................................. F16L 55/18
[52] U.S. Cl. ........................................ 138/98; 285/15;
    405/150.1; 405/154
[58] Field of Search .................... 138/93, 97, 98, 103;
    29/402.09, 402.13; 264/36, 269; 285/15;
    405/150.1, 154; 206/582

[56] References Cited

U.S. PATENT DOCUMENTS

| | | |
|---|---|---|
| Re. 30,929 | 5/1982 | Maimets . |
| 646,804 | 4/1900 | Clark ..................... 138/98 |
| 1,301,285 | 4/1919 | Leonard ............... 138/98 X |
| 2,583,316 | 1/1952 | Bannister ............. 138/97 X |
| 2,977,994 | 4/1961 | Xenis ....................... 138/97 |
| 3,678,560 | 7/1972 | Dufour et al. . |
| 3,700,265 | 10/1972 | Dufour et al. . |
| 3,834,422 | 9/1974 | Larson .................. 138/93 X |
| 3,946,761 | 3/1976 | Thompson et al. ... 138/93 X |
| 4,124,985 | 11/1978 | Maimets . |
| 4,197,880 | 4/1980 | Cordia ..................... 138/99 |
| 4,346,922 | 8/1982 | Ohtsuga et al. . |
| 4,347,018 | 8/1982 | Wrightson et al. .... 138/97 X |
| 4,361,451 | 11/1982 | Renaud . |
| 4,602,659 | 7/1986 | Parkyn, Sr. ........... 138/93 X |
| 4,647,072 | 3/1987 | Westman . |
| 4,956,032 | 9/1990 | Hahn et al. ............ 264/36 X |
| 5,035,539 | 7/1991 | Kawafuji et al. ..... 138/97 X |
| 5,042,532 | 8/1991 | Gilleland ................... 138/98 |
| 5,049,003 | 9/1991 | Barton .................. 138/97 X |
| 5,096,332 | 3/1992 | Kawafuji ............. 405/154 X |
| 5,119,862 | 6/1992 | Maimets et al. .......... 138/98 |
| 5,224,742 | 7/1993 | Ooka et al. ........... 138/98 X |

FOREIGN PATENT DOCUMENTS

| | | |
|---|---|---|
| 8707049 | 8/1987 | Fed. Rep. of Germany . |
| 2370225 | 6/1978 | France . |
| 90/05267 | 5/1990 | PCT Int'l Appl. . |
| 91/02920 | 3/1991 | PCT Int'l Appl. . |
| 2136912 | 9/1984 | United Kingdom . |

*Primary Examiner*—Stephen F. Gerrity
*Attorney, Agent, or Firm*—Sandler Greenblum & Bernstein

[57] ABSTRACT

Method and apparatus for internal repair of conduit system. An inner sleeve is employed which is configured to avoid undue pressure being applied to the inner surface of a damaged conduit section as it is expanded into position. A grouting area is defined between the outer surface of the sleeve and the inner surface of the conduit section or sections being repaired. In one embodiment, a layer of open-celled material is placed around the coiled sleeve, which is thereafter impregnated with a quantity of grout. In this embodiment of the invention, each longitudinal end of the sleeve is flared outwardly for contacting the inner surface of the damaged conduit section and for retaining the grout as it is squeezed out of the gasket upon the expansion of the inner sleeve to its expanded and locked position.

27 Claims, 8 Drawing Sheets

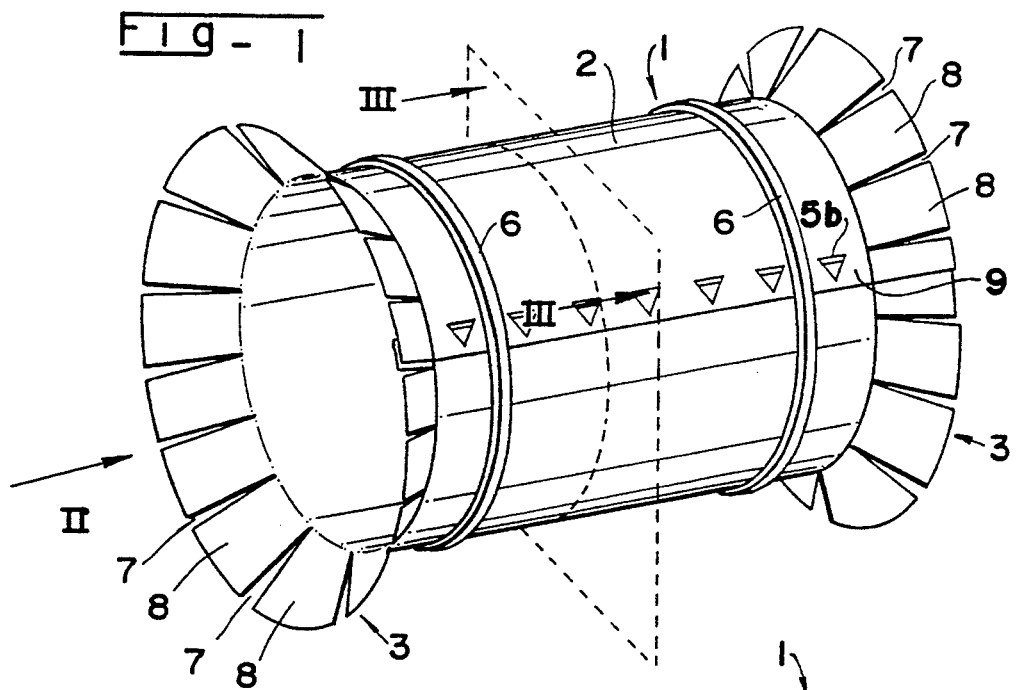
Fig-1
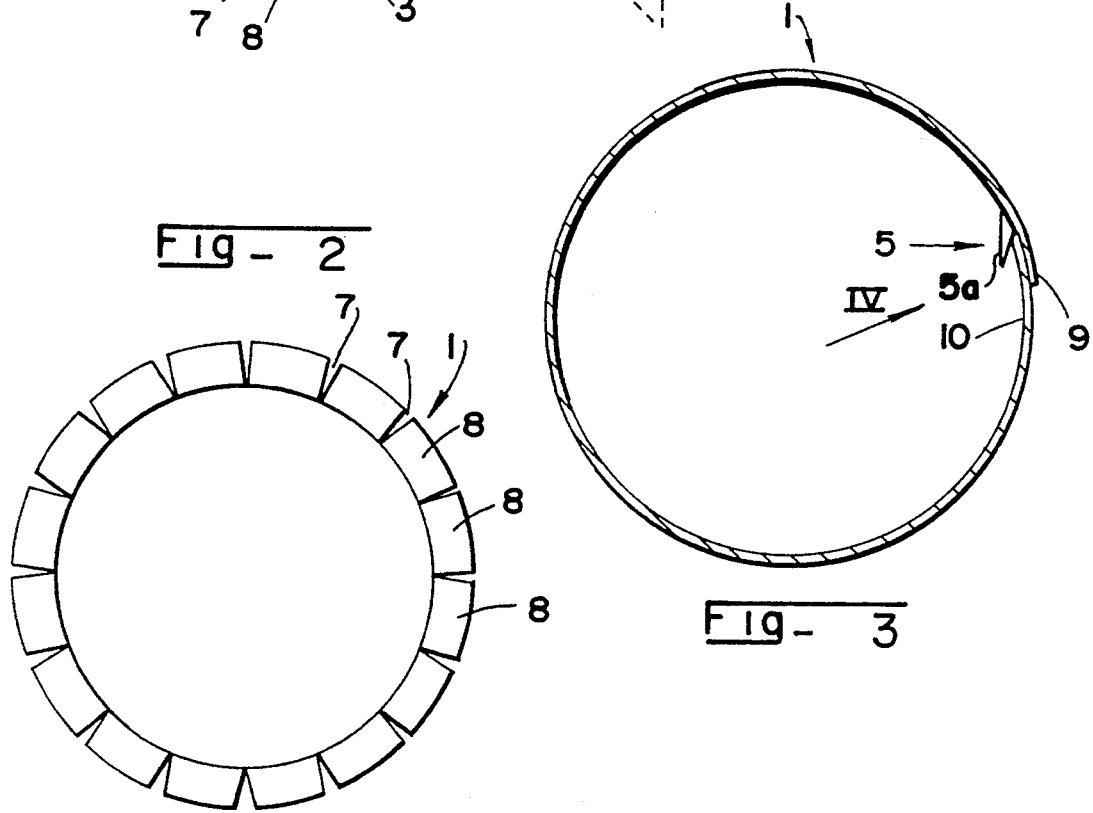
Fig-2
Fig-3

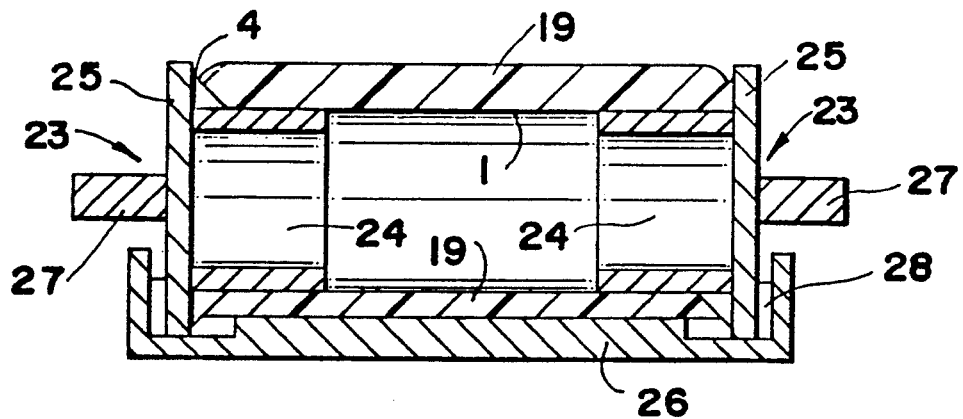
Fig. 9
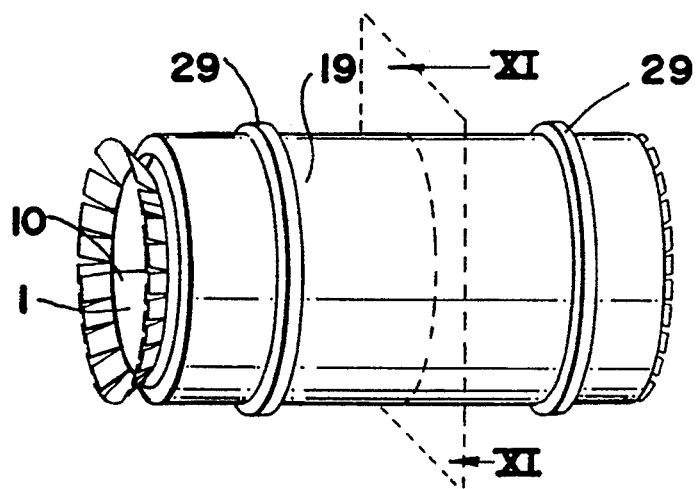
Fig. 10
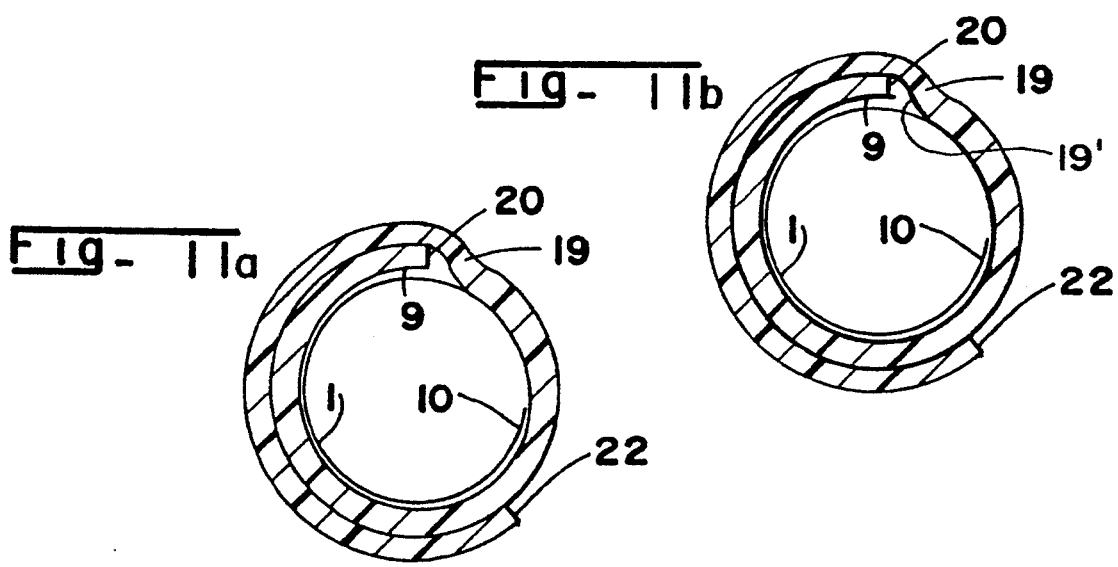
Fig. 11a
Fig. 11b

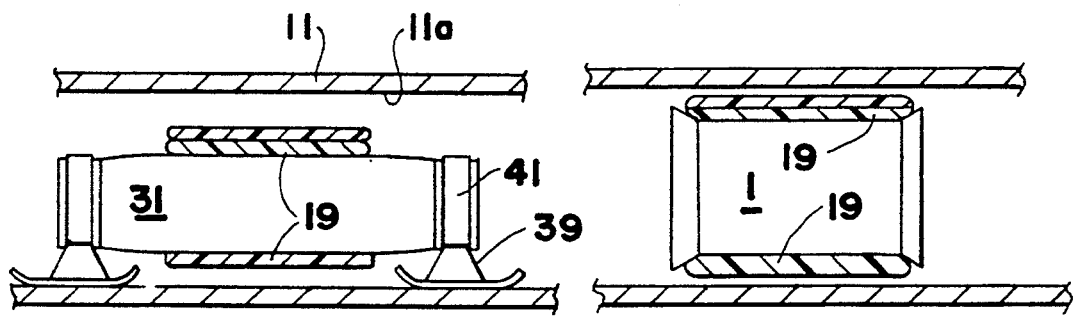
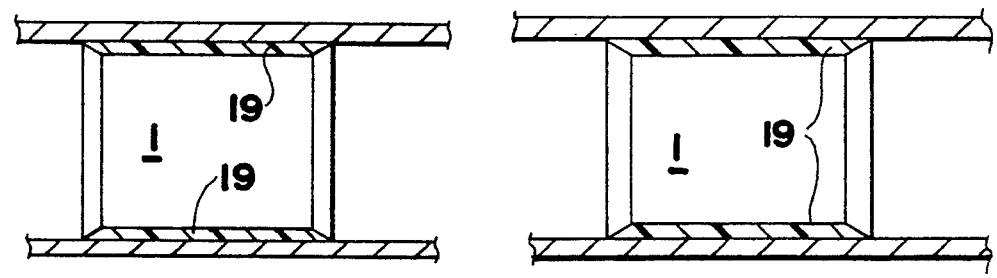
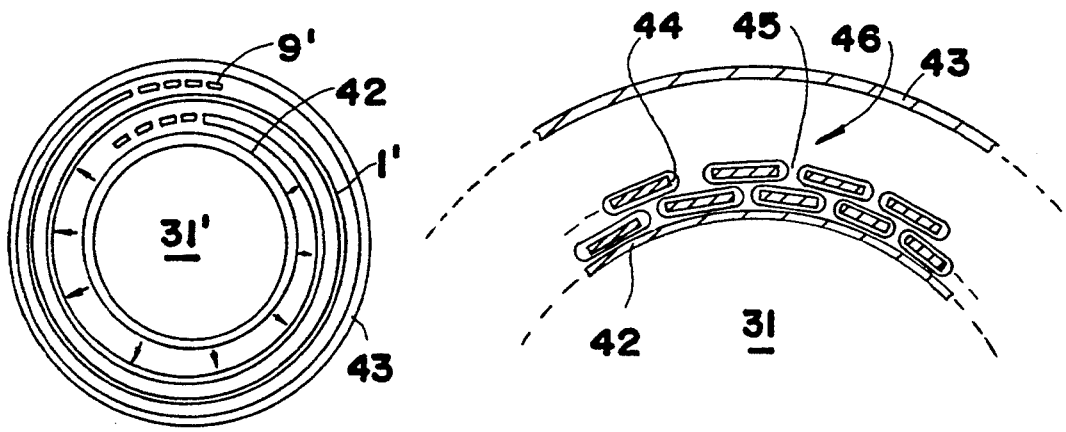

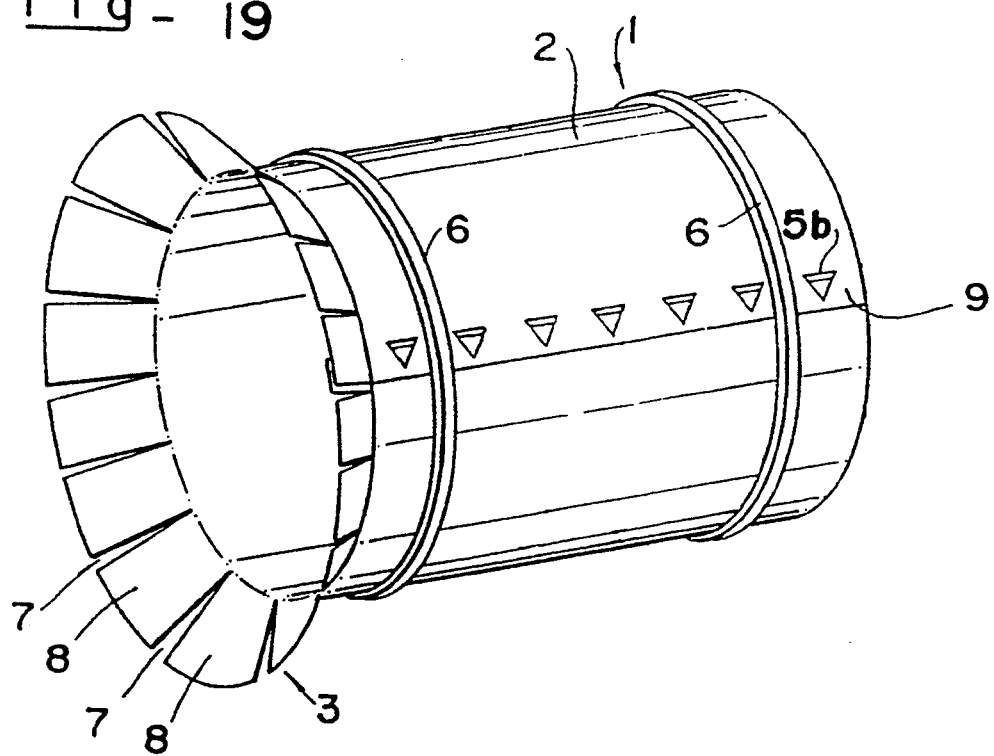

APPARATUS FOR REPAIRING CONDUITS

BACKGROUND OF THE INVENTION

1. Field of the Invention

The present invention relates to methods and apparatuses for repairing conduits. More particularly, the invention is directed to methods and apparatuses for repairing damaged, weakened, or leaking conduits that are located in areas to which it is difficult to gain access, for example, sewer pipes or other conduits that are located underground.

2. Description of Related Art

Conduit systems for carrying water or wastewater, for example, and other liquid and fluid conveyance systems, as well as conduit systems that house communication lines, for example, are typically located underground and, in general, are not easily accessible after installation. Over a period of time, such conduit systems become damaged, weakened, or otherwise begin to deteriorate and leak at the joints between adjacent conduit sections, for example. Such deterioration is caused, for example, by the settling of the surrounding earth adjacent the conduit system, by deterioration of the joints themselves over time, and/or by the growth of roots from trees and other plants.

In wastewater systems, wastewater can begin to leak from the damaged conduit and create problems of pollution, for example. In addition, damaged conduit sections invite the intrusion of rainwater into the system, adding to the volume of water carried to the treatment facility, thereby overburdening it. In conduits for communication systems, damage to the conduit can result in interruption of the service provided.

Further, deteriorated conduits for liquid conveyance systems, including sewer systems, that result in leaks can soak the surrounding terrain, sometimes creating sinkholes and exacerbating drainage problems. Further, service lines for gas, electricity, communications and other services, which themselves are not initially in need of repair, become damaged due to the re-settling of the water-saturated terrain in which they are located, thereby disabling same. Still further, support for buildings and bridges, for example, provided by the terrain in which a leaking conduit is located, can become weakened, thereby risking additional property damage or more serious concerns including loss of life.

A variety of solutions to the problem of repairing buried conduit sections have been proposed in the art. The most common solution, perhaps, involves excavation around the damaged conduit section and either the repair or replacement of the damaged section. However, excavation is time-intensive and, particularly in urban areas, it creates additional problems. For example, the destruction of overlying road surfaces is frequently necessary for gaining access to the damaged conduit section, thereby necessitating the re-routing of traffic and the subsequent need for re-building and re-surfacing the road, adding to the cost of the repair. In addition, communication lines, water lines, gas lines, and other residential and/or commercial services that extend beneath the ground, can also be temporarily interrupted during the repair.

Methods have also been developed for repairing a damaged conduit section from within and without the need for excavation. Such methods include the mere application of a grout material for sealing cracks and joints, for example. It is also known in the art to re-line damaged conduit sections with a liner that is expanded from a coiled configuration to a final configuration in which the liner is secured against the inner surface of the damaged conduit section. A recent implementation of an internal conduit repair apparatus and method is disclosed in U.S. Pat. No. 5,119,862, issued on Jun. 9, 1992.

The latter-mentioned implementation includes the use of a compressible covering or gasket that is secured adjacent the outer surface of a sleeve liner to thereby form a composite liner/gasket combination. The sleeve and gasket combination is then coiled and inserted into a damaged conduit section, whereafter a "sewer plug", that is, an expandable air bag or, alternatively, any other internal means for expansion, forces the sleeve radially outwardly until the gasket is compressed against the inner surface of the damaged conduit section. After such compression, the internal expansion means is deactivated, whereby the sleeve is permitted to retract, that is, recoil slightly, thereby permitting the overlapping edges of the sleeve to become locked, due to a particular structural configuration of the edges.

Other examples of internal conduit repair systems are disclosed in U.S. Pat. No. 3,678,560, issued on Jul. 25, 1972; U.S. Pat. No. 3,700,265, issued on Oct. 24, 1972; U.S. Pat. No. 4,124,985, issued on Nov. 14, 1978; U.S. Pat. No. 4,346,922, issued on Aug. 31, 1982; U.S. Pat. No. 4,361,451, issued on Nov. 30, 1981; U.S. Pat. No. 4,647,072, issued on Mar. 3, 1987; U.S. Reissue Pat. No. 30,929, issued on May 11, 1982; and United Kingdom Patent Application No. 2,136,912, published on Sep. 26, 1984.

In U.S. Pat. No. 3,678,560 and a division thereof, namely, U.S. Pat. No. 3,700,265, an internal pipe sealing device is described in which an inner retaining member is placed within an outer sealing member, the outer sealing member being a cylindrical elastic member against which the inner retaining member is expanded inside of a pipe joint, thereby to seal the joint.

In U.S. Pat. No. 4,124,985 and Reissue Pat. No. 30,929, by the inventor of the instant patent, a method of lining the interior of a conduit is disclosed in which hinged collapsible sections are expanded against the conduit by means of one or more air bags. After the collapsible liner section has been erected and put into position, grout or other filler material is then inserted between the liner section and the conduit wall.

A device for sealing the joint of large diameter pipes, such as gas mains and water mains, is disclosed in U.S. Pat. No. 4,346,922. The device includes a cylindrical member made of an elastic material for covering the inside periphery of the pipe joint and circular expanding members for expanding the cylindrical member against the pipe joint. Belt members, impregnated with a bonding agent, such as epoxy resin, are positioned on the outside peripheral surface of the cylindrical member, at its ends, whereby the bonding agent is squeezed out by pressure, thereby obtaining an airtight and watertight bond between the outside peripheral surface of the cylindrical member at both of its longitudinal ends and the inside peripheral surfaces of the pipes.

U.S. Pat. No. 4,361,451 discloses a process for internally lining a conduit by coating the inner wall of the conduit with a first resin, coating the outer wall of a sleeve with a second resin, thereafter expanding the sleeve against the inner wall of the conduit, and maintaining pressure until the resins have become polymerized.

A system for repairing damaged pipes internally is also described in U.S. Pat. No. 4,647,072. A repair sleeve is used, primarily for repairing damaged wastewater pipes in which access to a damaged pipe section is difficult. The repair sleeve is a flexible tubular member and is expanded against the damaged pipe with a spiral spring positioned within the flexible tubular member.

U.K. Patent Application No. 2,136,912 discloses the repair of a damaged underground pipe by wrapping a sleeve around a collapsible inflatable bag, impregnating the sleeve with resin and expanding the sleeve against the damaged pipe until the resin is set.

Although the above-mentioned methods are directed to the repair of underground or otherwise inaccessible conduits without significant excavation, certain disadvantages remain. For example, in the systems in which resin is employed, an expansion pressure must be applied until the resin is sufficiently set to permit the withdrawal of the expansion means.

In the embodiments in which a liner is not utilized, any sealing of cracks or joints with resin or grout are only good for the short term and, therefore, require subsequent retreatment.

Further, in certain of the embodiments in which a liner is utilized, internal pressure is applied against the damaged pipe section, during expansion of the sleeve against the interior of the damaged pipe, thereby risking additional damage or weakening of the conduit, which could necessitate subsequent repair.

SUMMARY OF THE INVENTION

It is therefore an object of the present invention to improve upon known internal conduit repair methods and apparatus. More specifically, the present invention provides methods and apparatus for internally repairing conduits that are more efficiently implemented than those known in the art. That is, the present invention is simpler and less costly than known methods and apparatus. Further, the present invention provides methods and apparatus that do not require significant internal pressures to be applied to the damaged conduit section and, therefore, that do not risk the possibility of additional damage to the damaged and/or weakened conduit section. Still further, conduit joints repaired with the methods and apparatus of the present invention are stabilized, are completely sealed, and the repair is long-lasting. The present invention can be used for repairing offset joints, separated joints, longitudinal and radial cracks, small holes and cavities, and it serves to restore structural integrity and to provide a water-tight seal for stopping infiltration, exfiltration, and leaks.

To these ends, the repair apparatus of the invention includes a sleeve member movable from a coiled pre-installation position to an uncoiled installation position in the direction of the inner surface of the conduit under repair. Compared with known methods and apparatus, the present invention results in little or no radial force being exerted on the inner surface of the conduit under repair.

In the installation position of the sleeve, an annular grouting area is defined between the outer surface of the sleeve, or an outer surface of a covering on the sleeve, if used, and the inner surface of the conduit under repair. Preferably, the grouting area is limited at the longitudinal end portions of the sleeve by stop members. The stop members can be structural formations made in the end portions of the sleeves themselves, such as flared end portions, separate members extending around the end portions, or a combination thereof. For example, the ends of the sleeve could include both flared portions and additional stop members located just longitudinally inwardly of the flared end portions to assist the flared end portions in containing grout within the grouting area. In any event, preferably, the stop members are coiled with the remainder of the sleeve in the pre-installation position. Further, in certain embodiments of the invention, only the stop members, and not the outer surface of the sleeve itself, engage the inner surface of the conduit under repair.

In another aspect of the invention, an expanding grout is activated in the grouting area between the sleeve and the inner surface conduit section under repair. One feature of the expandable grout is that it provides, or assists in providing, a force to effect the locking of the sleeve in its uncoiled installation position. In this regard, it is also contemplated that additional means could be provided for the purpose of effecting the locking of the sleeve. For example, one or more elastic bands could be placed around the sleeve in the coiled position so that, once the expanding force is removed, after reaching a slightly over-expanded condition, the elastic bands provide a recoil force directed toward the aforementioned locking.

The means for locking the sleeve in the uncoiled installation position can comprise any number of forms. For example, along one edge of the coiled sleeve, a series of punched-out projecting tangs are effective, after the aforementioned slight over-expansion of the sleeve, for receiving the opposite edge of the sleeve.

In a further embodiment of the invention, the locking of the sleeve in the uncoiled position does not require an initial over-expansion of the sleeve. For example, the present invention includes the use of a thermosettable, thermoplastic or thermofusible coating on the outer surface of the sleeve so that, after expansion of the sleeve into the uncoiled installation position, the coating is heated, thereby melting same, including the melting of the coating on the overlapped edges of the sleeve. Upon removal of the heating source, the edges of the sleeve are thereby welded together. One method of heating and melting the layer of thermoplastic coating, for example, is by means of resistance elements embedded in the coating layer.

The present invention provides embodiments for use with both "wet" and "dry" conduits. That is, in some repair environments, the conduit system of section in need of repair contains a significant amount of water, for example, either flowing or stagnant. In certain situations, the water or flow of water could be removed for the time needed to perform the repair and, consequently, the type of repair method chosen would not need to take into account the presence of water. On the other hand, should water be present that cannot be pumped out or otherwise removed, certain embodiments of the present invention can be best utilized to render the presence of water irrelevant or, at least, minimally significant.

With further regard to specific structural details, the conduit repair apparatus of the invention, the components of which could be considered as forming a conduit repair kit, includes a sleeve member including (i) a sheet of material having an outer surface and being movable from a coiled pre-installation position, in which the sheet of material generally surrounds a longitudinal axis, to an uncoiled installation position; and (ii) a pair of longitudinally spaced-apart stop members affixed to the outer surface of the sheet of material, an annular area thereby being limited, in the uncoiled installation position, by (1) the outer surface of the sheet of material, (2) the pair of stop members, and (3) an inner surface of a conduit to be repaired. In a specific feature of the repair apparatus of the invention, a quantity of grout is placed in the annular area.

It is contemplated that the material from which the sleeve is made can include stainless steel, plastic coated steel, and plastic.

In a further aspect of the invention, the sheet of material has a pair of longitudinally extending opposite edge regions, and the stop members have a length extending generally from one of the pair of edge regions to another of the pair of edge regions.

In one embodiment of the invention, each of the pair of longitudinally spaced-apart stop members includes an elastic band surrounding the sleeve member in the coiled pre-installation position to thereby exert a force on the sleeve member in a direction favoring the coiled pre-installation position.

In an additional embodiment of the invention, the pair of longitudinally spaced-apart stop members include opposite end regions of the sheet of material which are flared outwardly from an outer surface of the sheet of material for contacting the inner surface of the conduit to be repaired in the uncoiled installation position. More specifically, the flared opposite end regions are radially flexible relative to the remainder of the sleeve member, the apparatus further including at least one layer of tape over an outer surface of each of the flared opposite end regions.

In a further embodiment of the invention, the conduit repair apparatus includes a sleeve member including (i) a sheet of material having an outer surface and being movable from a coiled pre-installation position, in which the sheet of material generally surrounds a longitudinal axis, to an uncoiled installation position; (ii) at least one elastic band surrounding the sleeve member for exerting a force on the sleeve in a direction favoring the coiled pre-installation position; and (iii) a first longitudinal edge portion and a second longitudinal edge portion, the first longitudinal edge portion and the second longitudinal edge portion overlapping at least in the coiled pre-installation position and, in the uncoiled installation position, having complementary means for locking the sleeve member in the uncoiled installation position.

In a still further embodiment, the conduit repair apparatus includes (a) a sleeve member including (i) a sheet of material having an outer surface and an inner surface and being movable from a coiled pre-installation position, to an uncoiled installation position, at least two edge regions of the sheet of material overlapping in the uncoiled installation position; and (ii) a layer of thermoplastic material on the outer surface and the inner surface of the sheet of material, and (b) means for heating the thermoplastic material to thereby fuse the overlapping edge regions of the sheet of material together in the uncoiled installation position.

More specifically in this embodiment, the means for heating can include an electrical resistance means embedded in the thermoplastic material or a device for conducting heat internally of the sleeve member.

Still further in this embodiment of the invention, the conduit repair apparatus includes a pair of longitudinally spaced-apart stop members affixed to an outer surface of the sheet of material, an annular area being defined, in the uncoiled installation position, by (1) the outer surface of the sheet of material, (2) the pair of stop members, and (3) an inner surface of a conduit to be repaired.

According to an additional embodiment of the invention, the conduit repair apparatus includes a sleeve member including a sheet of material made of a plastic material and being movable from a coiled pre-installation position, to an uncoiled installation position, at least two edge regions of the sheet of material overlapping in the uncoiled installation position, and a solvent for partially dissolving the two overlapping edge regions for fusing the overlapping edge regions, upon evaporation of the solvent, in the uncoiled installation position.

Further according to this embodiment, the conduit repair apparatus further includes pair of longitudinally spaced-apart stop members affixed to outer surface of the sheet of material, an annular area being defined, in the uncoiled installation position, by (1) the outer surface of the sheet of material, (2) the pair of stop members, and (3) an inner surface of a conduit to be repaired.

In a still further preferred embodiment of the invention, the conduit repair apparatus includes a sleeve member including:

(i) a sheet of material having an outer surface and being movable from a coiled pre-installation position, in which the sheet of material generally surrounds a longitudinal axis, to an uncoiled installation position;

(ii) a pair of opposite end portions, each of the end portions having a flared portion projecting outwardly and longitudinally away from the outer surface of the sheet of material, wherein, in both the coiled pre-installation position and the uncoiled installation position, the outer surface of the sheet of material and the flared portions limit a grouting area; and (iii) a first longitudinal edge portion and a second longitudinal edge portion, the first longitudinal edge portion and the second longitudinal edge portion extending from one of the pair of opposite end portions to the other of the pair of opposite end portions, the first longitudinal edge portion and the second longitudinal edge portion overlapping at least in the coiled pre-installation position. A grouting material is located in the grouting area to complete the repair installation.

In a specific feature of the invention, a means for locking the first longitudinal edge portion and the second longitudinal edge portion of the sheet to form the sheet into a generally tubular configuration is provided.

It is contemplated that a covering could be placed upon the outer surface of the sleeve if, for example, it were desired to reduce the size of the grouting area and to thereby reduce the quantity of grout needed for a given installation.

In a specific embodiment of the invention, a porous gasket is placed around the grouting sleeve for being infused with a quantity of grout. The porous gasket is preferably made of an open-celled material. It is also contemplated to provide a strengthening covering on a side of the gasket to be placed adjacent the grouting sleeve to provide peripheral strength to the gasket and to permit it to slide relative to the grouting sleeve as the grouting sleeve expands from the coiled position to the uncoiled position. The open-celled material can comprise cellulose and the strengthening layer can comprise a polyethylene sheet.

Still further according to a specific embodiment of the invention, the porous gasket is impregnated with a quantity of grout, the porous gasket placed around the grouting sleeve. At least one elastic band is then placed around the the porous gasket for retaining the porous gasket upon the grouting sleeve.

The grout can be a member selected from the group consisting of a water-reactive expanding polyurethane grout; a water-reactive gel-forming grout; an epoxy hardening grout; and a cementitious grout.

In an additional embodiment of the invention, a layer of thermoplastic material can be placed upon the outer surface of the grouting sleeve. In this embodiment, means for heating the thermoplastic material and fusing overlapping regions of the sleeve is provided.

More specifically, the heating means can take the form of resistance elements embedded into the thermoplastic material. Alternatively, the heating means can take the form of a jacket for surrounding the expandable air plug, that is, the internal expansion means, for conductively heating the thermoplastic coating from within.

In an alternative embodiment, the conduit repair apparatus of the invention includes a sleeve made of a plastic material and a quantity of solvent is provided for fusing overlapping portions of the sleeve in the uncoiled installation position.

In the conduit repair method according to a particular embodiment of the present invention, in which the sleeve has a layer of thermoplastic material on the outer surface and the inner surface thereof, the sleeve member being movable from a coiled pre-installation position, to an uncoiled installation position, at least two edge regions of the sheet of material overlapping in the uncoiled installation position, the method including the steps of:

positioning the sleeve member within a conduit to be repaired;
expanding the sleeve member to move the sleeve member to the uncoiled installation position;
heating the thermoplastic material; and
terminating the heating, thereby fusing the overlapping edge regions of the sheet of material together in the uncoiled installation position.

More specifically, the method includes the steps of (a) placing a pair of longitudinally spaced-apart stop members to the outer surface of the sleeve member in the coiled pre-installation position prior to the step of expanding, whereby in the uncoiled installation position, the an annular area is defined by (1) the outer surface of the sheet of material, (2) the pair of stop members, and (3) an inner surface of a conduit to be repaired; and (b) placing grout within the annular area.

In the conduit repair method according to an alternative embodiment of the invention, the sleeve member includes a sheet of material made of a plastic material and is movable from a coiled pre-installation position, to an uncoiled installation position, at least two edge regions of the sheet of material overlapping in the uncoiled installation position, the method including the steps of:

positioning the sleeve member within a conduit to be repaired;
expanding the sleeve member to move the sleeve member to the uncoiled installation position;
applying a solvent at least to the two overlapping edge regions for fusing the overlapping edge regions of the sheet of material together in the uncoiled installation position.

More specifically, this embodiment of the method includes (a) placing a pair of longitudinally spaced-apart stop members to the outer surface of the sleeve member in the coiled pre-installation position prior to the step of expanding, whereby in the uncoiled installation position, the an annular area is defined by (1) the outer surface of the sheet of material, (2) the pair of stop members, and (3) an inner surface of a conduit to be repaired; and (b) placing grout within the annular area.

In a further aspect of the inventive method, in which the grouting sleeve has an outer surface, a pair of longitudinally extending edges and a pair of opposite end portions, the edges extending from one of the pair of end portions to the other of the end portions, and the pair of longitudinally extending edges overlapped in a coiled pre-installation position and at least one of the edges having a device for locking the one of the edges to a portion of the other of the edges, the method including the steps of:

(a) positioning the grouting sleeve within a conduit to be repaired in the coiled pre-installation position;
(b) forcing the grouting sleeve to expand from the coiled pre-installation position to an uncoiled installation position toward an inner surface of the conduit; and
(c) activating an expandable grout between the outer surface of the grouting sleeve and the inner surface of the conduit, thereby activating the device for locking the at least one of the edges for locking the one of the edges to the portion of the other of the edges.

In a still further aspect of the inventive method, in which the grouting sleeve has an outer surface, and a pair of longitudinally extending edges and a pair of opposite end portions, the edges extending from one of the pair of end portions to the other of the end portions, and the pair of longitudinally extending edges being overlapped in a coiled pre-installation position, at least one of the edges having a device for locking the one of the edges to a portion of the other of the edges, and at least one elastic band surrounding the grouting sleeve, the method including the steps of:

(a) positioning the grouting sleeve within a conduit to be repaired in the coiled pre-installation position;
(b) expanding the grouting sleeve from the coiled pre-installation position to an uncoiled installation position toward an inner surface of the conduit against an elastic opposing force of the at least one elastic band; and
(c) terminating the step of expanding, thereby permitting the at least one elastic band to exert a force on the grouting sleeve for activating the locking device for locking the at least one of the edges to the portion of the other of the edges.

According to a still further aspect of the method of the invention, in which the grouting sleeve has outer surface, a pair of longitudinally extending edges and a pair of opposite end portions, the edges extending from one of the pair of end portions to the other of the end portions, each of the pair of opposite end portions having an outwardly projecting stop member, and the pair of longitudinally extending edges being overlapped in a coiled pre-installation position, the method including the steps of:
- (a) positioning the grouting sleeve within a conduit to be repaired in the coiled pre-installation position; and
- (b) expanding the grouting sleeve from the coiled pre-installation position to an uncoiled installation position toward an inner surface of the conduit, whereby the outwardly projecting stop member at each of the end portions contacts the inner surface of the conduit in the uncoiled installation position, thereby forming an annular space limited lengthwise by the outwardly projecting stop members on the pair of opposite end portions and limited thickness-wise by the outer surface of the grouting sleeve and the inner surface of the conduit, grout being located within the annular space.

According to a still further aspect of the method of the invention, in which the grouting sleeve has an outer surface, a pair of longitudinally extending edges and a pair of opposite end portions, the edges extending from one of the pair of end portions to the other of the end portions, each of the pair of opposite end portions having an outwardly projecting flexible flare, and the pair of longitudinally extending edges being overlapped in a coiled pre-installation position, the method including the steps of:
- (a) positioning the grouting sleeve within a conduit to be repaired in the coiled pre-installation position; and
- (b) forcing the grouting sleeve to expand from the coiled pre-installation position to an uncoiled installation position toward an inner surface of the conduit, whereby the outwardly projecting flares at each of the end portions contacts the inner surface of the conduit in the uncoiled installation position, thereby forming an annular space extending length-wise between the outwardly projecting flares on the pair of opposite end portions and extending thickness-wise between the the grouting sleeve and the inner surface of the conduit, grout being located in the annular space.

More specifically according to the method of the invention, before the step of positioning the grouting sleeve, the step of placing the grout around the grouting sleeve when the grouting sleeve is in the coiled pre-installation position is included. More specifically, according to this aspect of the invention, the step of placing grout around the grouting sleeve comprises the steps of placing a porous gasket around the grouting sleeve; and infusing grout into the porous gasket. In a still further aspect of the invention, the step of infusing grout into the porous gasket comprises the step of placing the grouting sleeve having the porous gasket around it into a container of grout.

Still further, the gasket is secured to the grouting sleeve by means of an adhesive. Alternatively, the gasket is secured to the grouting sleeve by means of a mechanical attachment device including a member selected from the group consisting of at least one elastic band encircling the gasket and grouting sleeve; at least one spring-like wire encircling the gasket and grouting sleeve; and at least one hook fixed to the grouting sleeve and to the gasket.

In a specific aspect of the invention, the step of infusing grout into the porous gasket comprises the steps of affixing a roller assembly to each end of the grouting sleeve in the coiled pre-installation position of the grouting sleeve, each of the roller assemblies having a handle; placing the grouting sleeve having the porous gasket around it into a container of grout; and rotating the grouting sleeve and gasket about a longitudinal axis of the sleeve.

Still further according to the invention, after the step of positioning the grouting sleeve within a conduit, the method includes the step of applying water or a catalyst to the grout.

More specifically, after the step of positioning the grouting sleeve within a conduit, the method includes the step of applying water to the grout during the step of forcing the grouting sleeve to expand from the coiled pre-installation position to an uncoiled installation position.

In a still further specific embodiment of the invention, in which the sleeve is coated with a thermoplastic material, after the step of forcing the grouting sleeve to expand from the coiled pre-installation position to an uncoiled installation position, the method further includes the step of heating the thermoplastic material.

In a specific aspect of the invention, the step of positioning the grouting sleeve within a conduit to be repaired includes the steps of placing the grouting sleeve upon a vehicle and transporting the grouting sleeve to the conduit to be repaired by means of the vehicle.

Further, the step of positioning the grouting sleeve within a conduit comprises the step of placing the grouting sleeve within a plurality of conduit sections, bridging a joint between two adjacent conduit sections.

Still further, according to a further aspect of the invention, each of the pair of longitudinally extending edges has a locking configuration for engagement with a complementary locking configuration on the other of the pair of longitudinally extending edges, the step of expanding the sleeve further including the step of expanding the sleeve until the locking configurations on the longitudinally extending edges become engaged, thereby locking the sleeve against recoil.

According to a still further aspect of the invention, the step of expanding the sleeve further comprises the step of expanding the sleeve until the outwardly projecting flares contact the inner surface of the conduit, the sleeve exerting pressure on the inner surface of the conduit only through the outwardly projecting flares; and permitting the sleeve to recoil to the uncoiled installation position.

Still further, according to an additional aspect of the invention, before the step of positioning the grouting sleeve within a conduit, the method includes the step of placing at least one elastic band around the grouting sleeve; and the step of expanding the sleeve further comprising the steps of expanding the sleeve until the outwardly projecting flares contact the inner surface of the conduit, the sleeve exerting pressure on the inner surface of the conduit only through the outwardly projecting flares, and permitting the sleeve to recoil to the uncoiled installation position with the assistance of the at least one elastic band.

In an additional feature of the invention, the method includes the step of placing a quantity of stop material adjacent an inside surface of each of the outwardly projecting flares.

According to a further embodiment of the invention, after the step of forcing the grouting sleeve to expand from the coiled pre-installation position to an uncoiled installation position toward an inner surface of the conduit, the method includes the step of injecting grout into the annular space.

More specifically, in this embodiment of the invention, before the step of positioning the grouting sleeve within a conduit, the method includes the step of attaching a syringe to the grouting sleeve when the grouting sleeve is in the coiled pre-installation position, wherein the step of injecting grout into the annular space comprises injecting grout through the syringe and into the annular space.

Further, before the step of positioning the grouting sleeve within a conduit, the method includes the step of placing at least one elastic band around the grouting sleeve.

BRIEF DESCRIPTION OF THE DRAWINGS

The above and additional objects, characteristics, and advantages of the present invention will become even more apparent in the following detailed description of preferred embodiments, with reference to the accompanying drawings which are presented as non-limiting examples, in which:

FIG. 1 is a perspective view of a preferred embodiment of the grouting sleeve of the present invention, in the uncoiled installation position;

FIG. 2 is an end view of the grouting sleeve of FIG. 1, taken in the direction of arrow II in FIG. 1;

FIG. 3 is a transverse cross-sectional view of the grouting sleeve of FIG. 1, taken in the direction of arrow III of FIG. 1;

FIG. 9 is a longitudinal cross-sectional elevation view of the grouting sleeve having the gasket wound around it, and placed into a container of grout;

FIG. 10 is a perspective view of the grouting sleeve in its coiled pre-installation configuration, with the gasket impregnated with grout and being secured to the grouting sleeve with a pair of elastic bands;

FIGS. 11a and 11b are transverse cross-sectional views of the grouting sleeve and gasket, taken at the cross-sectional plane indicated in FIG. 10, in the direction of arrows XI—XI;

FIG. 14a is a schematic illustration of the grouting sleeve, with a grout-impregnated gasket thereon, being transported to the location of a damaged conduit section;

FIG. 14b is a schematic illustration of the grouting sleeve partially expanded at the location of the damaged conduit section;

FIG. 14c is a schematic illustration of the grouting sleeve over-expanded against the inner surface of the conduit section;

FIG. 14d is a schematic illustration of the grouting sleeve in its final installation position;

FIG. 15 is transverse cross-sectional elevation view of a further embodiment of the invention, in which the sleeve is perforated, at least near the edge portions, and has a layer of thermoplastic material, which is melted for locking the sleeve in the expanded position;

FIG. 16 is an enlarged view of an upper portion of the embodiment of FIG. 15, in a partially expanded position of the sleeve;

FIG. 19 is a perspective view of a variation of the embodiment of the grouting sleeve shown in FIG. 1.

DETAILED DESCRIPTION OF PREFERRED EMBODIMENTS

Figure 4:
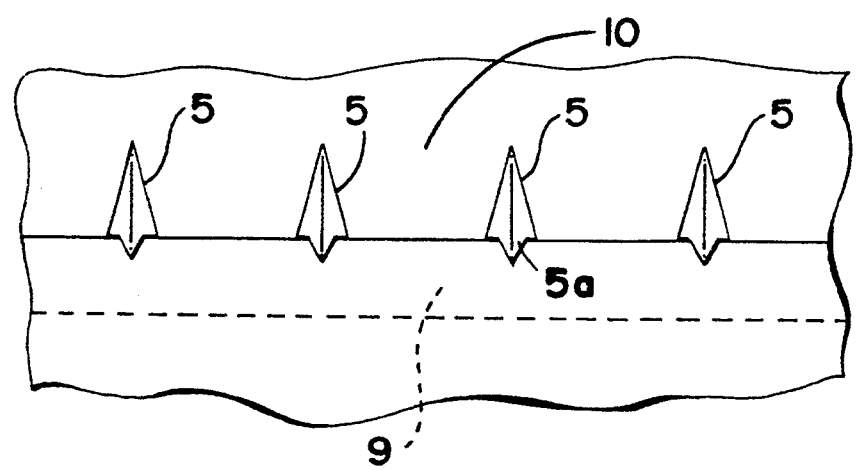
FIG. 4 is an enlarged, partial view of a detail of the locking arrangement of the grouting sleeve of FIG. 3, taken in the direction of arrow IV of FIG. 3.

With respect to the drawings, only enough of the construction of the invention has been depicted, to simplify the illustration, as needed for those of ordinary skill in the art to readily understand the principles of the invention.

A significant aspect of the present invention is the structural configuration and function of the inner conduit liner, or sleeve member. As will be further discussed below, due to this structural configuration of the sleeve, less pressure is exerted on the inner surface of the damaged or weakened conduit section under repair during the installation of the sleeve.

In FIG. 1, the grouting sleeve 1 of the invention is shown in its uncoiled expanded and locked position. For the sake of simplicity of illustration, only the sleeve is shown in FIG. 1, no grout being located on the outer surface 2 of the sleeve 1. At each end portion of the sleeve 1 is an outwardly projecting flare 3, including an outer flare surface 4 which generally provides an extension of the outer surface 2 of the sleeve. Although the angle of the flares or flare portions 3 relative to the outer surface 2 of the sleeve is shown to be approximately 45°, other angles can be utilized and still enable the sleeve to meet the objectives further described below.

Further, the dimensions of the sleeve can be any of a variety of dimensions, dependent upon the internal diameter and the length of the damaged or weakened area of the conduit section to be repaired. The invention can be used to repair and/or seal polyvinyl chloride (PVC) and clay pipe, for example, including six inch PVC pipe and standard 10 inch clay pipe, having an internal diameter of 9.75 inches.

The invention is suitable for internally repairing conduits, pipes, and sections thereof having a wide range of diameters. For example, it is contemplated that a sleeve could have a length of 12 inches, 24 inches, or 36 inches, for example, and an outer diameter of 6, 8, 10, 12, 15, 21, or 24 inches, when expanded to the uncoiled installation position. It is contemplated that the material from which the sleeve is formed can have a thickness of from 26 through 18 gauge, preferably 22 or 24, and can be formed from stainless steel, in which type 304 could be considered standard, although type 316 could also be used. Alternatively, the sleeve 1 can be made from non-stainless steel, aluminum, plastic, such as PVC, for example. In short, a range of materials and dimensions could be used in constructing the sleeve, the selection being limited only to the extent that the function of the sleeve, as described herein, would be significantly impaired.

FIG. 2 shows the grouting sleeve of FIG. 1 viewed from an end thereof in the direction of arrow II. As shown therein, as well as in FIG. 1, the flared portions 3 of the sleeve 1 are constructed by having made a series of spaced cuts 7 along the end of the material from which the sleeve is made, around the periphery of the sleeve 1 when the sheet of material is formed into a coiled tubular configuration as shown in FIG. 1, thereby producing a series of flare elements 8. Of course, as the flare elements are bent outwardly from the outer surface 2 of the sleeve 1, the cuts 7 are transformed into the V shape shown in the end view of FIG. 2.

Also as shown in FIG. 1, in which the grouting sleeve 1 appears in its uncoiled installation position, and as shown in FIGS. 3 and 4 in more detail, a locking arrangement, generally identified with reference numeral 5, is provided by means of which the longitudinal edge regions 9, 10 of the sleeve are locked together as further described below. Any adequate locking arrangement can be utilized, although the present invention contemplates the use of a locking arrangement which is "self-actuable", i.e., one that is engaged without direct manipulation thereof.

Specifically, as shown in FIGS. 3 and 4, on one edge region 9 of the sleeve 1, longitudinally spaced tangs or projecting members 5a can be punched from the sleeve itself, thereby projecting away from the surface of the sleeve. In FIG. 1, generally triangular openings 5b can be seen in the upper surface of the sleeve 1, the openings from which the projecting members 5a are formed. Also in FIG. 1, a portion of the longitudinal edge region 10 can be seen through the openings 5b. In FIG. 3, the projecting members are shown projecting inwardly, whereby the longitudinal edge of edge region 10 is captured by the projecting members extending from edge region 9. Alternatively, other locking configurations can be utilized, if desired.

The grouting sleeve 1 has been described as being movable from a coiled pre-installation position to an uncoiled installation position. The latter position refers to the configuration of the sleeve as shown in FIGS. 1 and 3, for example. It is clearly shown that even in the "uncoiled" position, the longitudinal edge regions 9, 10 of the sleeve are overlapped to a slight degree (or to a significant degree in later described embodiments) and, therefore, could be described as being "coiled" to various degrees. Nevertheless, the sleeve in the installation position is referred herein as being "uncoiled" relative to the pre-installation position.

Still further, the extent to which the edge portions or regions 9 and 10 extend depend upon the type of sleeve under consideration and could extend substantially around the sleeve member if significant portions of the sleeve member are overlapped, as will be more apparent as the description proceeds. The embodiment of FIG. 15 is one such example.

Also shown in FIG. 1 are a pair of elastic bands 6, one or more of which can optionally be located around the grouting sleeve for the purpose further mentioned below.

Figure 5:
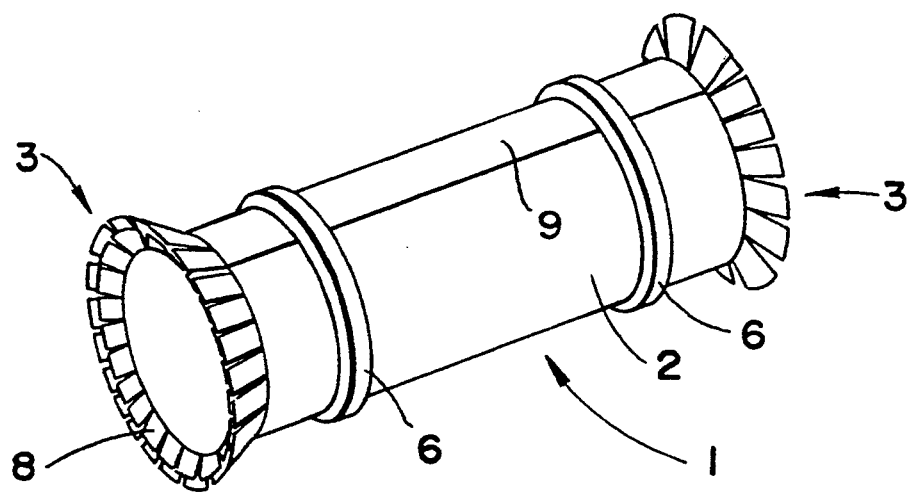
FIG. 5 is a perspective view of a preferred embodiment of the grouting sleeve of the present invention, in the coiled pre-installation position.

FIG. 5 illustrates the grouting sleeve 1 in its coiled pre-installation position, without grout therearound, similar to FIG. 1 in this regard.

Figure 6:
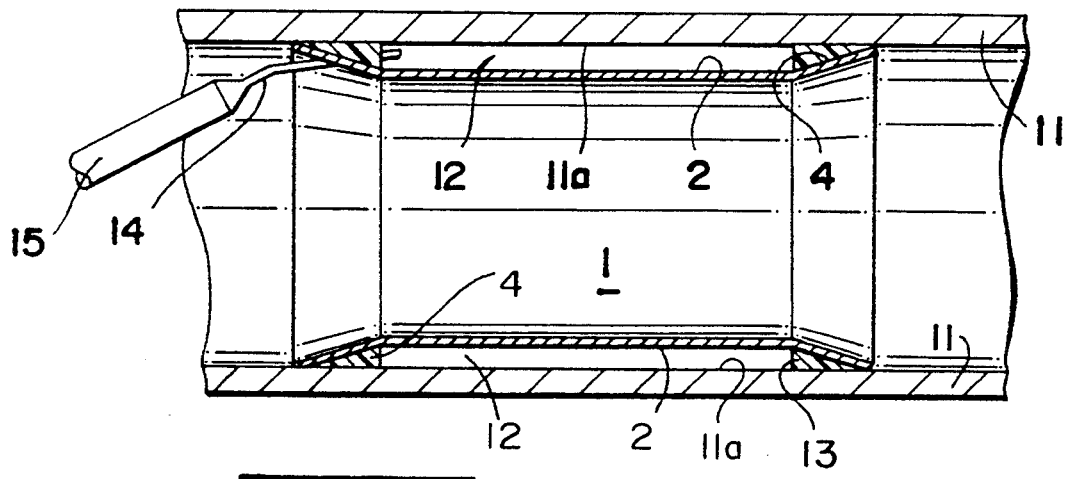
FIG. 6 is a schematic longitudinal cross-sectional elevation view of the grouting sleeve of one embodiment of the invention, in which grout is injected into the grouting area, after the grouting sleeve is located in its uncoiled installation position.

In FIG. 6, the grouting sleeve 1 is shown positioned within a damaged or weakened conduit section 11. When the grouting sleeve 1 is installed in a completed installation at the site of the conduit section, a quantity of grout is located in a grouting area 12 defined by the outer 2 surface of the sleeve 1, the outer surfaces 4 of the flare portions 3, and the inner surface 11a of the conduit section 11. It is contemplated in this regard that the outer surface of the sleeve could have placed thereon a layer of material, such as a foam of open or closed cells to reduce the volume of the grouting area and, therefore, the amount of grout needed to be applied. Nevertheless, for the purpose of this description of the invention, the "grouting area" is defined in the aforementioned manner, but should be considered to include an embodiment having the application of the aforementioned layer of material on the sleeve outer surface.

FIG. 6 also shows stop material 13, which is optional, and is provided to assist in sealing the grout within the grouting area 12. As shown, the stop material 13 comprises a pair of bands, having triangular cross-sections, for example, for placement in the area between the outer surface 4 of the flare portions 3 and the inner surface 11a of the conduit section to be repaired. The stop material 13 can be made from any of a number of materials, as long as the material performs the function of sealing the grout within the grouting area and, preferably, is inert to the material or composition thereof from which the grout is made.

Also depicted in FIG. 6 is a nozzle comprising a grout needle 14, connected to a grout hose 15, connected to a source of grout which is injected into the grouting area 12 after the expansion of the sleeve 1 to its uncoiled installation position, the expansion being described further below. In an alternative embodiment, instead of the needle 14, a hose section could extend along the entire length, or along substantially the entire length of the grouting area 12, and the hose could have perforations spaced along its length. Thus, upon injection of grout through the hose 15 and into the hose section within the grouting area, the grout would be injected through the spaced perforations from the hose section within the grouting area, thereby generally evenly spreading the grout along the length of the grouting area.

In this embodiment in which a perforated hose section is utilized, the surface of the sleeve could be prepared in advance by providing an adhesively secured layer of material, such as a foamed material, in which longitudinally spaced annular grooves are provided which align with the aforementioned longitudinally spaced perforations in the hose section. Thus, upon injection of the grout via the hose section, the grout would exit the perforations into the spaced annular grooves and would then progress around the sleeve circumference within each of the respective grooves. This embodiment would reduce the amount of grout needed for completing an installation. Further, the reduced amount of grouting needed makes possible the use of a conventional manually actuated "caulking gun" for injection of the grout.

Figure 7:
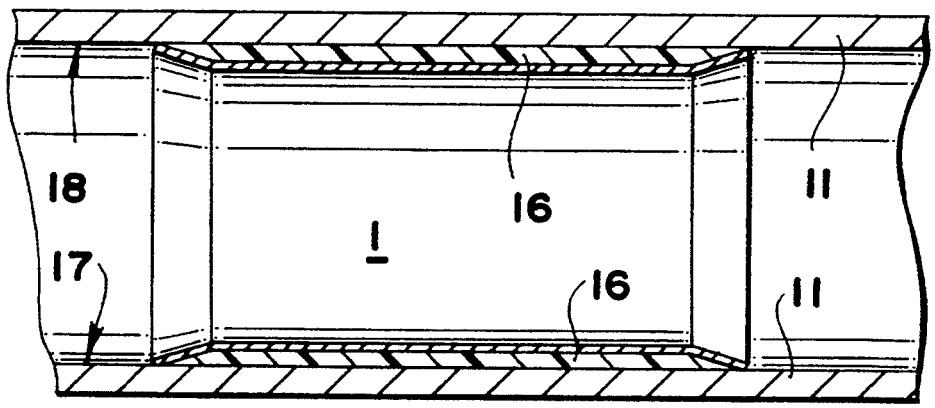
FIG. 7 is a schematic longitudinal cross-sectional elevation view of the grouting sleeve of the invention, in the uncoiled installation position in which the grout, whether injected after installation, or applied before installation.

Whether the application of grout is accomplished by means of injection with the hose 15 and needle 14 or perforated hose section, or by means of a different method as further described below, after the final installation, as shown in FIG. 7, the grout completely fills the grouting area 12 and thereby seals the sleeve 1 from the inner surface 11a of the damaged or weakened conduit section 11.

FIG. 7 schematically illustrates the final installation of the grout sleeve 1 of the invention and dimensions shown therein should not be considered as limiting or representative of a typical installation. For example, the resulting reduction in the effective diameter of the conduit 11 at the area in which the sleeve is installed is not as significant as shown. For example, the thickness of the installed sleeve is on the order of 0.325 inches, but could range, for example, from approximately 0.5 inches to 0.25 inches, if desired. Further, due to the weight of the entire assembly, that is, the sleeve and grout, for example, and the settling of the assembly as the grout cures, for example, the height of the grouting area 12 at the bottom 17 of the conduit 11 can be typically less than that at the top 18 of the conduit. Therefore, the final assembly of the sleeve and grout is effective to provide only a slight increase in the height of the lower surface of the conduit.

Figure 8:
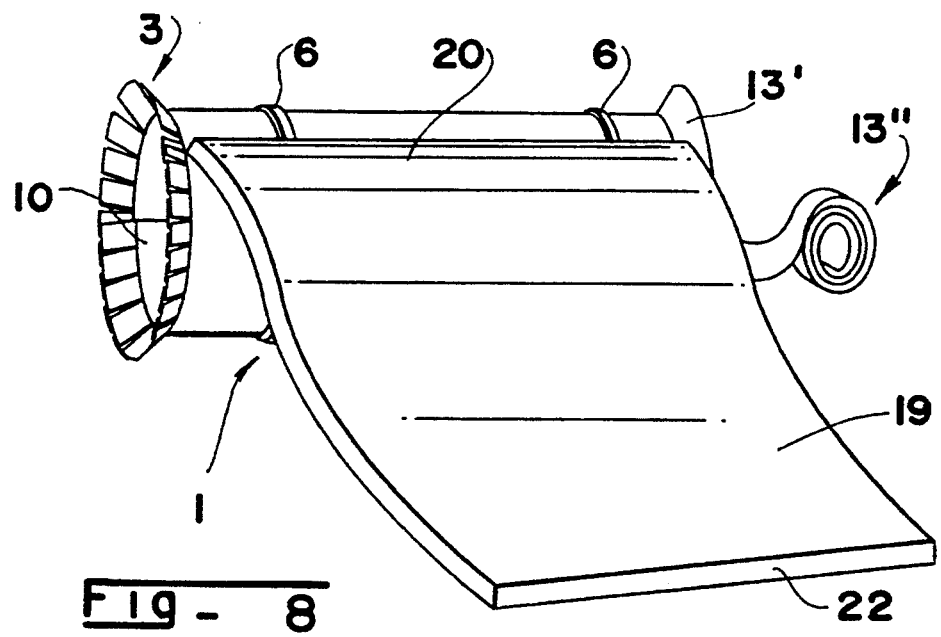
FIG. 8 is a perspective view of the grouting sleeve having the gasket affixed at one end thereof prior to application of the grout.

FIGS. 8–11b schematically illustrate an embodiment of the invention in which grout is applied to the outer surface of the sleeve 1 prior to positioning same into the conduit to be repaired. Specifically, FIG. 8 illustrates a blanket of material, comprising a porous gasket 19, into which the grout material can be infused. The porous gasket can be an open celled plastic material, such as cellulose sponge foam or a polyethylene open-celled foam, or any other material that can absorb a significant quantity of grout, to be explained.

Satisfactory results can be achieved in the use of a gasket in which the gasket surrounds the sleeve approximately once, in the uncoiled installation position of the sleeve. It has been found that if the ends of the gasket overlap to some degree, no apparent problem results. Further in this regard, it has been found that by providing an overlap at the upper portion of the sleeve, in the installed position, a generally thicker amount of foam is achieved at the top and a lesser, but adequate, amount of foam is achieved at the bottom, thereby providing a lesser raising of the lower inner surface of the conduit under repair, which is not disadvantageous from the standpoint of inhibiting water flow through the conduit system.

Further, satisfactory results can be achieved in the use of 0.75 inch thick cellulose sponge foam, 0.75 inch thick polyethylene open-celled foam of approximately 20–30 pore and 0.5 inch thick polyethylene foam of approximately 80 pore.

In the present invention, the primary purpose of the gasket is that of a grout carrier medium. Due to its relatively easy compression transversely, a relatively neglible amount of rebound force is provided by the porous gasket 19 itself against either the sleeve or the inner surface of the conduit under repair.

The gasket 19 has a width sufficient to extend at least approximately from one flare portion 3 to the other flare portion 3, although this width, as well as the length around the sleeve and thickness of the gasket 19, can be otherwise determined, and is only limited to the extent that an adequate quantity of grout, in the installation position of the sleeve, would be located in the grouting area 12.

Although stop elements could be used like those shown in FIG. 6, it is also contemplated that, instead, the outer surfaces of the flare portions could be sealed with a plastic tape 13', extending from a tape roll 13", as shown in FIG. 8. If desired, the tape can also be used to seal the openings 5b, mentioned above, although little, if any, grouting is found to escape through openings 5b during the installation of the sleeve if they are left open and untaped.

With reference to the figures, after the sleeve 1 is coiled in its pre-installation position, optionally secured in this position by means of one or more elastic bands 6, the gasket 19 is affixed by a contact adhesive or by some appropriate mechanical means, first at one end 20, to the outer surface 2 of the sleeve 1. The other end 22 of the gasket 19 is left loose, as illustrated in FIG. 8.

To increase the strength of the gasket 19 in the direction of its length, particularly to facilitate relative sliding thereof around the sleeve as the sleeve expands to its uncoiled position, a thin layer of strengthening material 19' can be applied to the surface of the gasket that would otherwise come in contact with the sleeve, as shown in FIG. 11b. For example, the sheet of strengthening material could be made of polyethylene or cellophane or other plastic. The strengthening material could be advantageously placed to the portion of the gasket that will only be sliding upon an adjacent gasket layer and not along the entire length of the gasket.

After the end 20 of the gasket 19 is secured to the outer surface of the sleeve, a process is performed for impregnating or substantially impregnating the gasket with grout. The grout could be any of a class of water-reactive types that are commercially available. For example, 3M brand 5600 Foam or DeNeef Hydroactive Flex LV can be utilized, the latter with or without a 5% Hydroactive Flex catalyst to speed the time of final installation.

For impregnating the gasket with grout, a roller assembly 23 is affixed to each respective end of the coiled sleeve. As shown in FIG. 9, each roller assembly 23 includes a plug 24 that is inserted into each end of the coiled sleeve. A roller 25 is affixed to each plug 24 for preventing grout from penetrating into the interior of the coiled sleeve and for enabling the coiled sleeve, with gasket thereon, to be rolled in the grout tray 26 by means of handles 27 which project longitudinally from each of the rollers 25.

It has been found that when using a water-reactive grout and a cellulose sponge as the gasket material, an application of grout to a dry sponge is absorbed, but that the sponge remains relatively hard. If, however, the sponge is first wetted with water, it becomes soft. Further, when the grout is applied in the latter instance, it absorbs faster and does not begin to cure instantly as might be expected.

As shown in FIG. 9, the grout tray 26 contains a quantity of grout 28. As the coiled sleeve 1 and gasket 19 are placed into the grout tray 26, with one end of the gasket still extending loosely from the sleeve, as shown in FIG. 8, the handles 27 are grasped and slowly rotated about their longitudinal axis, thereby rolling the gasket 19 onto the outer surface 2 of the grouting sleeve 1 and soaking the gasket in the grout 28 contained in the grout tray 26. This step is similar in principle to applying paint to a paint roller in a paint tray, with the additional step of rolling the gasket around the sleeve while rotating the handles.

Once the entire gasket 19 has been sufficiently immersed in the grout 28, the sleeve 1 with gasket 19 thereabout is removed from the tray 26. The roller assemblies 23 are removed from the ends of the sleeve and, as illustrated in FIG. 10, one or more elastic bands 29 are then placed around the gasket 19 to retain the gasket on the sleeve 1. The use of elastic bands 29 is optional. They are utilized merely as a convenience to avoid the inadvertent loosening of the gasket, having just been removed from the grout tray 26. The grout-impregnated gasket 19/sleeve 1 combination, illustrated in FIGS. 10 and 11, in the coiled pre-installation position, is now ready for repair of the damaged and/or leaking conduit or conduit joint.

Figure 12:
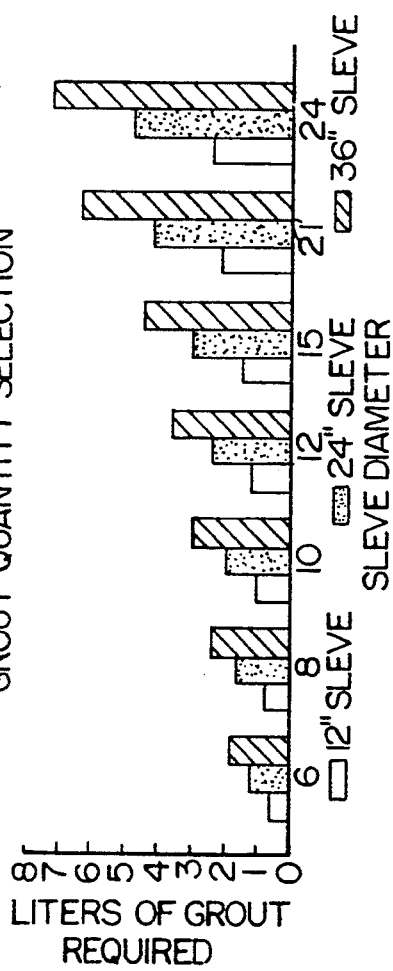
FIG. 12 is a graph illustrating the approximate quantities of grout, for three different sleeve lengths and seven different sleeve diameters, in the installed position.

FIG. 12 illustrates the approximate quantities of grout needed for three different sleeve lengths and seven different sleeve diameters, in the installed position.

Figure 13:
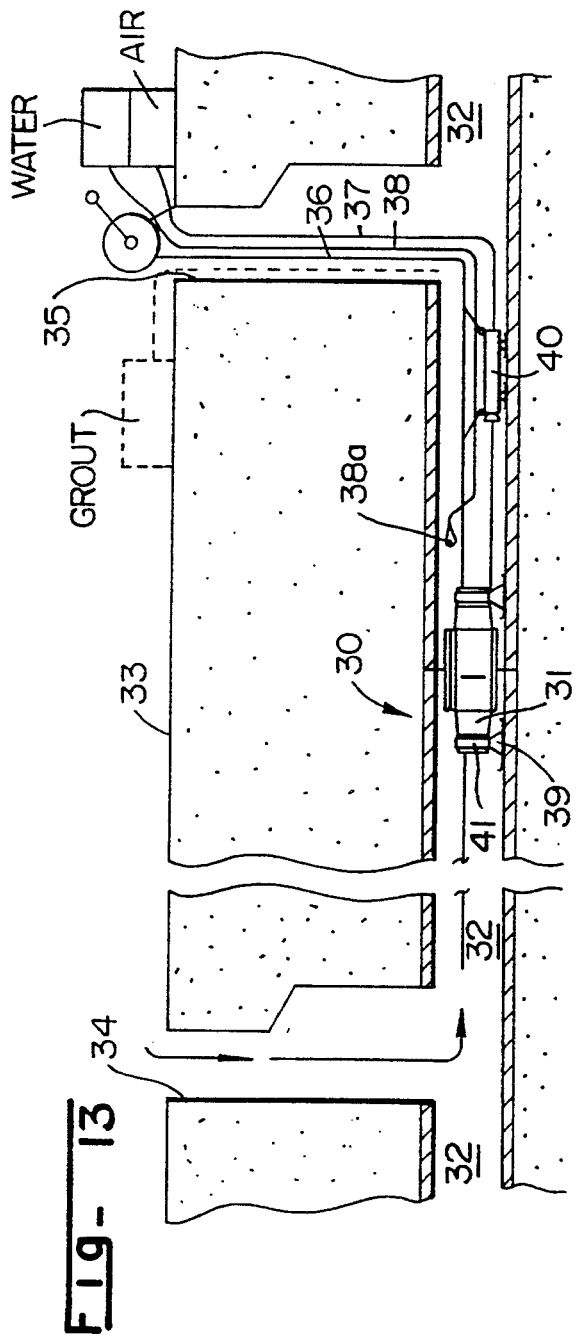
FIG. 13 is schematic cross-sectional view of a conduit system in which a joint is being sealed with the present invention, showing the sleeve and gasket having been transported to the repair site by means of an air plug.

Either at the repair site 30, shown in FIG. 13, for example, or prior to reaching the repair site, a means for expanding the sleeve from the coiled pre-installation position to the uncoiled installation position is applied to the gasket/sleeve combination. For example, an expandable compressed air-actuable assembly 31, commonly referred to as a "sewer plug", is inserted into the coiled sleeve. It is contemplated that a standard unreinforced 5-10B type plug can be used. The sewer plug is preferably sprayed with a release agent, such as a silicone spray, prior to insertion into the coiled sleeve. The sewer plug is then expanded enough to "grab" onto the sleeve.

FIG. 13 schematically illustrates in a cross-sectional elevation view, a location at which a conduit system is being repaired. As shown therein, the repair site 30 is part of a conduit system 32, such as a sewer system, extending below ground surface 33. Ground surface 33 could comprise a road surface in an urban area, whereby access to the sewer system is had via manholes 34, 35, for example. Since the invention avoids the need for excavation in the repair of the conduit system, the road surface 33 is not destroyed and traffic flow is not significantly interrupted. All materials needed in the repair are transferred through manholes 34, 35.

Prior to introduction of the sleeve assembly and associated materials into the sewer system, the sewer is preferably flushed, removing calcite and other debris. The locations of deterioration are inspected and recorded, together with any locations that might pose a problem for passing the sleeve assembly through and, if possible, eliminated. All cables 36, e.g., are prepared and readied in position for pulling the sleeve, sewer plug 31, cctv camera 40, and water line 38 and spray 38a into position. The video camera 40 is utilized to assist the positioning of the assembly and generally to monitor the installation process remotely.

The sleeve/gasket/air bag assembly, i.e., the "sleeve assembly" is located on skid assemblies 39 (or wheeled dollies) or other vehicle to prevent the sleeve from dragging along the invert and to keep it spaced away from any water. It is then transported to the repair site 30.

When the sleeve assembly is correctly positioned and ready for expansion, the water spray 38a is activated to begin the foaming reaction of the grout. The sewer plug is then begun to be inflated at approximately one psi/sec to approximately 35 psi. The sewer plug is then deflated and the sleeve is locked into the uncoiled installation position. The installation is inspected, either manually or via the cctv, to verify that the sleeve has become locked. If the sleeve has not become locked, or if the sleeve has not become completely locked, the sewer plug can again be inflated to accomplish same.

FIGS. 14a-14d schematically illustrate the steps in moving the sleeve/gasket combination from the coiled pre-installation position to the uncoiled installation position. For the sake of simplicity, the sewer plug is shown only in FIG. 14a, but is not shown in FIGS. 14b-14d.

In FIG. 14a, the sleeve 1 is shown in transport to the repair site, mounted on sewer plug 31. The sewer plug supports the sleeve and is mounted on skids 39 via supports 41 that surround the ends of the sewer plug 31.

In FIG. 14b, the sleeve 1 is shown with the gasket 19 thereon, positioned on the bottom of the inside surface 11a of the conduit section 11 to be repaired. Alternatively, of course, the sleeve/gasket could be located at the site of a joint between two adjacent conduit sections to be sealed. The sleeve 1 in FIG. 14b is partially expanded, as depicted in the slightly enlarged internal diameter of sleeve 1 in FIG. 14b.

As mentioned above, before and/or during the expansion of the sleeve 1 and gasket 19, illustrated in FIG. 14b, when water-reactive grout is used, water can be sprayed, or otherwise applied, onto the gasket 19, by means of water line 38 and nozzle 38a. This facilitates the foaming or reacting of the grout around the sleeve 1.

Alternatively, the step of applying water can be omitted, permitting the grout to react with the moisture or water resident in the surrounding soil and/or environment at the repair site. This latter-mentioned alternative method would lengthen the total process but, however, inasmuch as the sleeve is locked in place by means of the present invention, it would remain secured until the grout completely cures.

As mentioned above, the skid assemblies 39 or other vehicle can support the sleeve. For example, skid assemblies 39 can be located on either each end of the sleeve beneath end assemblies 41 of the sewer plug during the expansion of the sleeve, to support the sleeve from the lower surface of the conduit section. This ensures that an adequate amount of grout is retained beneath the sleeve in the final installation position of the sleeve and is not squeezed out.

In any event, during expansion of the sleeve, grout is squeezed into the cracks and spaces in the conduit wall.

In FIG. 14c, the sleeve 1 is shown in a slightly overexpanded position, a position that is attained prior to the deflation and removal of the air bag. The slight overexpansion of the sleeve is necessary to effect the locking of the edge portions of the sleeve, i.e., as mentioned above with regard to FIGS. 3 and 4, the locking assembly 5 being located along the length of the sleeve.

That is, as the sleeve is over-expanded, the edge region 10 is withdrawn from beneath the members projecting inwardly from edge region 9. Thereafter, upon deflation of the sewer plug, the edge of the edge region 10 is moved toward the coiled position, but is captured by the longitudinally spaced members on edge region 9.

By virtue of the flare portions 3 of the sleeve 1, as the sleeve/gasket expands to the inner surface 11a of the conduit 11 under repair, the only forces opposing the expansion are localized forces at the areas of the ends of the flare elements 8 of the flare portions 3 and, if utilized, the elastic bands 6, 29 that encircle the sleeve 1 and/or gasket 19. That is, unlike the method employed in the aforementioned U.S. Pat. No. 5,119,862, in which the entire gasket is compressed against the inner wall of the conduit section under repair, to thereby provide a recoil or rebounding force for effecting the locking of the edges of the sleeve, in the present invention, as described in the immediately preceding paragraph, it is not necessary to compress gasket 19 against the inner surface 11a of the conduit. Further, due to the nature of the material from which the gasket 19 is made, only a neglible rebound force can be generated. Consequently, to effect the installation of the grouting sleeve 1 of the present invention, only a relatively minor pressure is necessary to be exerted by means of the sewer plug 31. Specifically, approximately 25 psi is needed to expand the sewer plug 31 itself. In effecting the installation of the sleeve of the present invention described herein, an additional 3-10 psi is needed. In contrast, in the aforementioned prior application, an additional 20-55 psi is needed to effect the installation.

Finally, FIG. 14d illustrates the sleeve in the uncoiled installation position, in which the sleeve 1 has recoiled slightly from the overexpanded position shown in FIG. 14c. The complete installation can be performed in as little as thirty minutes.

It is contemplated that instead of utilizing the above-mentioned blanket-grouting system, in which a gasket 19 is placed around the sleeve 1, or the injection system in which a nozzle 14 injects grout into the grouting area 12 after installation of the sleeve itself, in which the steps described in relation to FIGS. 14a-14d are performed prior to injection of the grout, alternative methods and apparatus can be employed.

Figure 17:
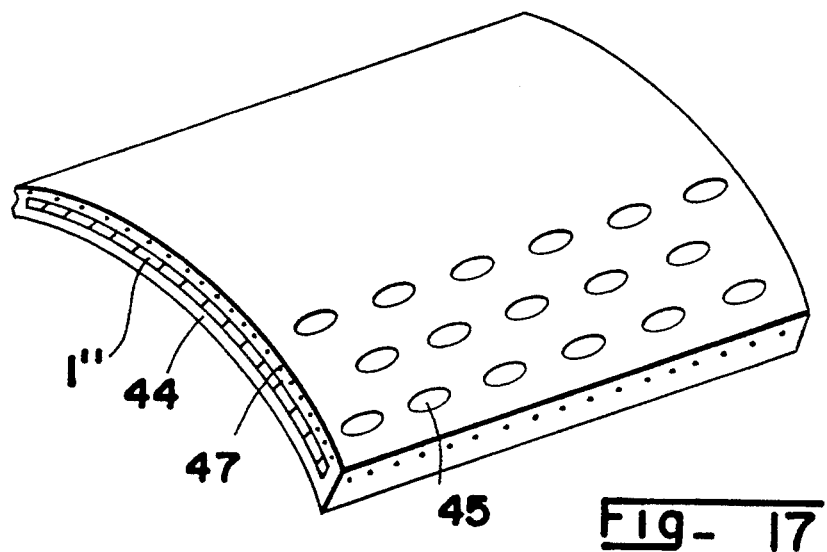
FIG. 17 is a perspective view of a portion of an alternative to the embodiment of FIGS. 15 and 16, in which an alternative embodiment, in which a perforated sleeve has a layer of thermoplastic material and a mat of electrically conductive fibers is embedded in the thermoplastic layer.

For example, FIGS. 15-17 schematically illustrate an embodiment in which the sleeve is coated with a layer of thermoplastic material 44. The sleeve has perforations 45 within which the thermoplastic layer can flow when heated, thereby fusing adjacent layers of the sleeve when cooled or, alternatively, through which solvents can flow for fusing the adjacent sleeve layers in the final installation position. These perforations can be located merely near the edge portions 9' and 10', as shown, or, preferably, they extend throughout the extent of the sleeve. Further, it is contemplated that projecting "teeth" can be formed in the sleeve, e.g., every 0.75 inches around the circumference of the sleeve, the sleeve being made of a steel mesh to catch the teeth upon a slight recoil movement.

In this embodiment, the length of the sleeve 1' can be made to be somewhat longer than sleeve 1. For example, it is contemplated that in the installed position, two overlapping layers of the sleeve are located throughout the circumference thereof, or substantially throughout the circumference, to facilitate fusing thereof.

To expand the sleeve, an air bag or sewer plug 31' is provided, similar to sewer plug 31 previously described, but additionally having a heating jacket 42 therearound for the purpose of heating the thermoplastic layer during expansion.

An outer insulation jacket 43 can be placed around the sewer plug 31' and heating jacket 42 to assist in retaining the heat and to seal the assembly from moisture.

In the embodiment of FIG. 17, resistance wires 47 can be embedded within the thermoplastic material so that, upon placement of the sleeve at the site of the conduit section to be repaired, an electrical current is applied, via an electric line, to thereby melt the thermoplastic material, thereby sealing and/or strengthening the damaged and/or weakened conduit section as the heat is removed.

FIG. 17 schematically illustrates resistance wires 47 embedded in a criss-crossing arrangement within the layer of thermoplastic material 44. Alternatively, instead of a criss-cross arrangement of resistance wires, a non-woven fabric mat made of electrically conductive fibers can be embedded in the layer of thermoplastic material 44 which is then connected to a source of electric current for melting the thermoplastic layer.

In an alternative embodiment, the sleeve could be made to have a shape like that described above with regard to FIGS. 15-17, but made from PVC, rather than a thermoplastic coated material, whereby, upon inflation of the sleeve to the uncoiled installation position, a solvent, such as toluene or other aromatic hydrocarbon, is applied to the sleeve, upon expansion of the sleeve, flowing along the surface of the sleeve, through openings thereof, thereby partially dissolving overlapping layers, fusing same upon evaporation of the solvent.

Alternatively, the sleeve could be made of polyethylene. In addition, it is also contemplated that the heat could be applied only to the areas of overlap of the edge regions. With regard to the resistance wire embodiments, the resistance wires could be embedded for less than the entire length around the circumference of the sleeve, that is, only locally at areas of overlap. Further, the openings or perforations in the sleeve could be also only localized at areas of overlap.

In the embodiments in which overlapping layers of the sleeve are fused, the embodiments utilizing thermoplastic or solvent fusing, for example, a locking arrangement like that described above, can be omitted, together with the need to over-expand the sleeve to effect the locking. Thus, even less pressure from the sewer plug is needed to complete the installation.

Further, the aforementioned sleeve fusion embodiments can be used in place of other sleeve embodiments generally known, or they can be used in conjunction with certain of the features of other embodiments of the repair apparatus, previously described. For example, upon fusion of the sleeve by means of thermoplastic or solvent fusion, without applying pressure against the inner surface of the conduit under repair, a grout can be located in a grouting area, in the manner described in the preceding embodiments of the invention. That is, stop elements, either flared end portions or separate elements attached to the sleeve, could be utilized in the manner described above.

Figure 18:
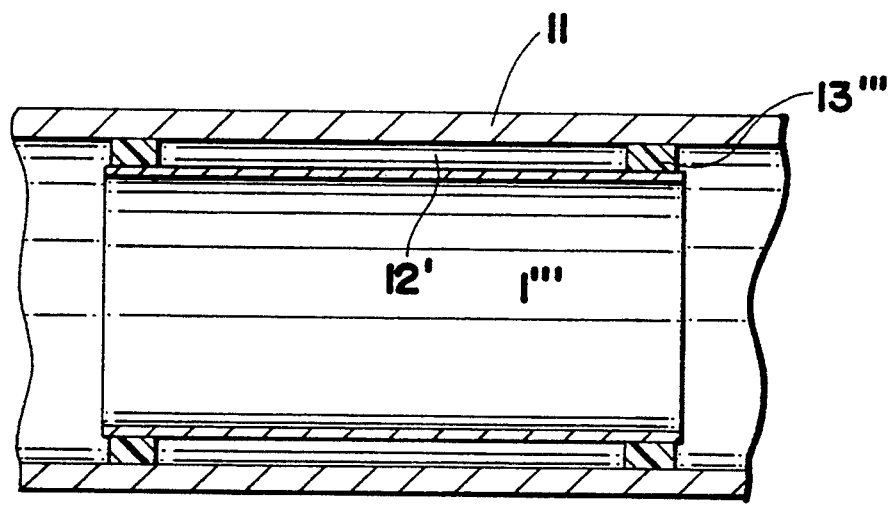
FIG. 18 is an elevational view of the general invention.

In FIG. 18, the present invention is depicted in a general schematic illustration. That is, although flares have been described in the preferred embodiment above, it is contemplated that a generally cylindrical sleeve 1''' could be utilized, with annular stops 13''' surrounding the ends to retain the grout which is either injected in the grouting area 12' or placed therein via a grout-impregnated pad. The stops 13''' can be made of an open-cell absorbent material, as described above, to lessen the rebound force upon the sleeve during expansion thereof. Alternatively, the stop material could be made of a denser open-cell material, compared to the aforementioned gasket, or from closed-cell material, thereby performing the function of a stop, yet providing only a relatively slight rebound force on the expanding sleeve.

Also, in the embodiment illustrated in FIG. 1, the sleeve 1 is shown to have a flare portion on each end. It is also contemplated that only one of the ends can be flared for lengthwise attachment to previously installed sleeves for the purpose of providing continuous repairs for longer lengths, for example, as shown in FIG. 19.

Finally, although the invention has been described with reference of particular means, materials and embodiments. It is to be understood that the invention is not limited to the particulars disclosed and extends to all equivalents within the scope of the claims.

What is claimed is:

1. A conduit repair apparatus comprising:
   a sleeve member comprising:
   (i) a sheet of material having an outer surface and being movable from a coiled pre-installation position, in which said sheet of material generally surrounds a longitudinal axis, to an uncoiled installation position; and
   (ii) a pair of longitudinally spaced-apart stop members affixed to the outer surface of said sheet of material, an annular area thereby being limited, in said uncoiled installation position, by (1) said outer surface of said sheet of material, (2) said pair of stop members, and (3) an inner surface of a conduit to be repaired, said pair of longitudinally spaced-apart stop members comprising opposite end regions of said sheet of material which are flared outwardly from said outer surface of said sheet of material for contacting the inner surface of the conduit to be repaired in the uncoiled installation position, said flared opposite end regions being radially flexible relative to the remainder of said sleeve member, wherein each of said flared opposite end regions comprises a plurality of distinct flare elements projecting outwardly and longitudinally away from said outer surface of said sheet of material.

2. A conduit repair apparatus according to claim 1, said apparatus further comprising at least one layer of tape over an outer surface of each of the flared opposite end regions of said stop members.

3. A conduit repair apparatus according to claim 1, further comprising a quantity of grout located in said annular area.

4. A conduit repair apparatus according to claim 1, said sheet of material being made of stainless steel.

5. A conduit repair apparatus according to claim 1, said sheet of material being made of plastic.

6. A conduit repair apparatus according to claim 1, said sheet of material being made of metal.

7. A conduit repair apparatus according to claim 6, said metal sheet of material having a coating of thermoplastic material.

8. A conduit repair apparatus comprising:
   a sleeve member comprising:
   (i) a sheet of material having an outer surface and being movable from a coiled pre-installation position, in which said sheet of material generally surrounds a longitudinal axis, to an uncoiled installation position;
   (ii) a pair of opposite end portions, each of said end portions having a flare portion projecting outwardly and longitudinally away from said outer surface of said sheet of material, said flare portions comprising radially flexible members, wherein, in both said coiled pre-installation position and said uncoiled installation position, said outer surface of said sheet of material and said flare portions define a grouting area; and
   (iii) a first longitudinal edge portion and a second longitudinal edge portion, said first longitudinal edge portion and said second longitudinal edge portion extending from one of said pair of opposite end portions to the other of said pair of opposite end portions, said first longitudinal edge portion and said second longitudinal edge portion overlapping at least in said coiled pre-installation position; and
   a porous gasket, said porous gasket comprising means for surrounding said sleeve between said opposite end portions of said sleeve in said grouting area, said porous gasket further comprising means for containing a quantity of grout, wherein each of said flare portions comprises a plurality of distinct flare elements projecting outwardly and longitudinally away from said outer surface of said sheet of material.

9. A conduit repair apparatus according to claim 8, further comprising means for locking said first longitudinal edge portion and said second longitudinal edge portion of said sheet to form said sheet into a generally tubular configuration.

10. A conduit repair apparatus according to claim 8, said sheet of material being a member selected from the group consisting of metal and plastic.

11. A conduit repair apparatus according to claim 8, further comprising a layer of thermoplastic material being placed upon said outer surface of said sleeve.

12. A conduit repair apparatus according to claim 11, further comprising resistance elements being embedded into said thermoplastic material for transferring heat to said thermoplastic material.

13. A conduit repair apparatus according to claim 12, wherein said gasket is located around said sleeve over said layer of thermoplastic material.

14. A conduit repair apparatus according to claim 13, further comprising a quantity of grout infused in said gasket.

15. A conduit repair apparatus according to claim 8, said sheet of material being plastic and said apparatus further comprising a quantity of solvent for fusing said overlapping first longitudinal edge portion and said second longitudinal edge portion in said uncoiled installation position.

16. A conduit repair apparatus comprising:
   a sleeve member comprising:
   (i) a sheet of material having an outer surface and being movable from a coiled pre-installation position, in which said sheet of material generally surrounds a longitudinal axis to an uncoiled installation position;
   (ii) a pair of opposite end portions, each of said end portions having a flare portion projecting outwardly and longitudinally away from said outer surface of said sheet of material, said flare portions comprising radially flexible members, wherein, in both said coiled pre-installation position and said uncoiled installation position, said outer surface of said sheet of material and said flare portions define a grouting area; and (iii) a first longitudinal edge portion and a second longitudinal edge portion, said first longitudinal edge portion and said second longitudinal edge portion extending from one of said pair of opposite end portions to the other of said pair of opposite end portions, said first longitudinal edge portion and said second longitudinal edge portion overlapping at least in said coiled pre-installation position;

a porous gasket, said porous gasket comprising means for surrounding said sleeve between said opposite end portions of said sleeve in said grouting area, said porous gasket further comprising means for containing a quantity of grout; and a quantity of grout contained within said porous gasket, said porous gasket surrounding said sleeve.

17. A conduit repair apparatus according to claim 16, said grout comprising a member selected from the group consisting of a water-reactive expanding polyurethane grout; a water-reactive gel-forming grout; an epoxy hardening grout; and a cementitious grout.

18. A conduit repair comprising:
a sleeve member comprising:
(i) a sheet of material having an outer surface and being movable from a coiled pre-installation position, in which said sheet of material generally surrounds a longitudinal axis, to an uncoiled installation position;
(ii) a pair of opposite end portions, each of said end portions having a flare portion projecting outwardly and longitudinally away from said outer surface of said sheet of material, wherein, in both said coiled pre-installation position and said uncoiled installation position, said outer surface of said sheet of material and said flare portions define a grouting area;
(iii) a first longitudinal edge portion and a second longitudinal edge portion, said first longitudinal edge portion and said second longitudinal edge portion extending from one of said pair of opposite end portions to the other of said pair of opposite end portions, said first longitudinal edge portion and said second longitudinal edge portion overlapping at least in said coiled pre-installation position; and
(iv) a porous gasket for placement around said sleeve, said porous gasket comprising means for containing a quantity of grout;
said porous gasket comprising an open-celled material, and said gasket having a strengthening covering on a side of said gasket to be placed adjacent said sleeve.

19. A conduit repair apparatus according to claim 18, said open-celled material being cellulose.

20. A conduit repair apparatus according to claim 18, said strengthening layer being a member selected from the group consisting of a polyethylene sheet and a cellophane sheet.

21. A conduit repair comprising:
a sleeve member comprising:
(i) a sheet of material having an outer surface and being movable from a coiled pre-installation position, in which said sheet of material generally surrounds a longitudinal axis, to an uncoiled installation position;
(ii) a pair of opposite end portions, each of said end portions having a flare portion projecting outwardly and longitudinally away from said outer surface of said sheet of material, wherein, in both said coiled pre-installation position and said uncoiled installation position, said outer surface of said sheet of material and said flare portions define a grouting area; and
(iii) a first longitudinal edge portion and a second longitudinal edge portion, said first longitudinal edge portion and said second longitudinal edge portion extending from one of said pair of opposite end portions to the other of said pair of opposite end portions, said first longitudinal edge portion and said second longitudinal edge portion overlapping at least in said coiled pre-installation position; and a porous gasket impregnated with a quantity of grout, said porous gasket surrounding said sleeve.

22. A conduit repair apparatus according to claim 21, further comprising at least one elastic band encircling said porous gasket for retaining said porous gasket upon said sleeve.

23. A conduit repair apparatus comprising:
a sleeve member comprising:
(i) a sheet of material having an outer surface and being movable from a coiled pre-installation position, in which said sheet of material generally surrounds a longitudinal axis, to an uncoiled installation position;
(ii) at least one band surrounding said sleeve member in said pre-installation position for exerting a force on said sleeve in a direction favoring said coiled pre-installation position during movement of said sheet of material to said uncoiled installation position; and
(iii) a first longitudinal edge portion and a second longitudinal edge portion, said first longitudinal edge portion and said second longitudinal edge portion overlapping at least in said coiled pre-installation position and, in said uncoiled installation position having complementary means for locking said sleeve member in said uncoiled installation position; and
a porous gasket placed around said sleeve, said porous gasket being impregnated with a quantity of grout.

24. A conduit repair apparatus comprising:
a sleeve member comprising:
(i) a sheet of material having an outer surface and being movable from a coiled pre-installation position, in which said sheet of material generally surrounds a longitudinal axis, to an uncoiled installation position; and
(ii) a stop member affixed to the outer surface of said sheet of material approximate a longitudinal end of said sheet of material in both said coiled pre-installation position and in said uncoiled installation position, an annular area thereby being limited, in said uncoiled installation position, by (1) said outer surface of said sheet of material, (2) said stop member, and (3) an inner surface of a conduit to be repaired; and
a porous gasket placed around said sleeve, said porous gasket being impregnated with a quantity of grout.

25. A conduit repair apparatus according to claim 24, wherein said sleeve member comprises a first sleeve member, wherein said stop member is affixed to a first end of said first sleeve member, said first sleeve member comprising a second end having no stop member, said conduit repair apparatus further comprising a second sleeve member, said second sleeve member having a first end, said first end of said second sleeve member being attached to said second end of said first sleeve member and said second sleeve member having a second end, said second end of said second sleeve member having a second stop member affixed thereto, whereby said annular area is further limited by said second stop member.

26. A conduit repair kit having component parts capable of being assembled in the field at a location in which a conduit is to be repaired, the kit comprising the combination of:

a sleeve member including:
(i) a sheet of material having an outer surface and being movable from a coiled pre-installation position, whereby said sheet of material is formed into a pre-installed coil, in which said sheet of material generally surrounds a longitudinal axis, to an uncoiled installation position;
(ii) a pair of opposite end portions, each of said end portions having a flare portion projecting outwardly and longitudinally away from said outer surface of said sheet of material, each of said flare portions being flexible and comprising a plurality of distinct flare elements projecting outwardly and longitudinally away from said outer surface of said sheet of material, wherein, in both said coiled pre-installation position and said uncoiled installation position, said outer surface of said sheet of material and said flare portions define a grouting area; and
(iii) a first longitudinal edge portion and a second longitudinal edge portion, said first longitudinal edge portion and said second longitudinal edge portion extending from one of said pair of opposite end portions to the other of said pair of opposite end portions, said first longitudinal edge portion and said second longitudinal edge portion overlapping at least in said coiled pre-installation position;

a porous gasket adapted to be placed around said pre-installed coil in said grouting area and adapted to be infused with a quantity of grout; and a quantity of grout adapted to be infused within said porous gasket.

27. A conduit repair kit according to claim 26, further comprising means for expanding said sleeve, said means for expanding being adapted to be inserted within said pre-installed coil and said means for expanding comprises means for applying an expansion force to cause said sleeve to move to said uncoiled installation position and to cause said flare portions of said sleeve to be deflected radially inwardly against an interior surface of the conduit to be repaired.

* * * * *